United States Patent [19]

Takahashi et al.

[11] Patent Number: 4,658,313
[45] Date of Patent: Apr. 14, 1987

[54] MAGNETIC SHIELD FOR ROTARY ACTUATOR IN A MAGNETIC DISC DEVICE

[75] Inventors: Hatsuo Takahashi, Chigasaki; Junichi Hibino, Minami-ashigara, both of Japan

[73] Assignees: Hitachi, Ltd.; Hitachi Electronics Engineering Co., Ltd., both of Japan

[21] Appl. No.: 541,441

[22] Filed: Oct. 13, 1983

[30] Foreign Application Priority Data

Oct. 15, 1982 [JP] Japan .................... 57-179869

[51] Int. Cl.⁴ .................................... G11B 5/012
[52] U.S. Cl. .......................................... 360/98
[58] Field of Search ........................ 360/97–99, 360/105, 106

[56] References Cited

U.S. PATENT DOCUMENTS

| 4,300,176 | 11/1981 | Gilovich | 360/105 |
| 4,331,991 | 5/1982 | Morehouse | 360/106 |
| 4,346,416 | 8/1982 | Riggle | 360/97 |
| 4,544,972 | 10/1985 | Kogure | 360/106 X |

Primary Examiner—A. J. Heinz
Attorney, Agent, or Firm—Antonelli, Terry & Wands

[57] ABSTRACT

A rotary actuator for a magnetic disc device for swinging a head arm to position a magnetic head mounted at an end of the head arm to a desired track of a magnetic disc is disclosed. Magnetic shield plates are provided to a magnetic circuit assembly which forms a voice coil motor together with a moving coil mounted at a rear end of a head carriage which supports the head arm in order to prevent leakage magnetic fluxes created in the vicinity of a permanent magnet of the magnetic circuit assembly from reaching the magnetic head.

5 Claims, 7 Drawing Figures

MAGNETIC SHIELD FOR ROTARY ACTUATOR IN A MAGNETIC DISC DEVICE

BACKGROUND OF THE INVENTION

1. Field of the Invention

The present invention relates to a rotary actuator for a magnetic disc device, and more particularly to a rotary actuator which is less affected by a leakage magnetic flux generated by a voice coil.

2. Description of the Prior Art

A magnetic disc device has an actuator to position a magnetic head onto a desired track of a disc which is an information record medium for recording and reproducing information. Usually, the actuator supports a plurality of arms having the magnetic heads at one end of a head carriage and drives the head carriage radially of the disc or circumferentially of the disc. The head carriage is driven by a voice coil motor which comprises a moving coil which protrudes from the other end of the head carriage and a magnetic circuit assembly including a permanent magnet and a yoke.

FIG. 1 shows a main portion of a prior art voice coil motor. A magnetic circuit comprises a vertical yoke 7 and horizontal yokes 5A, 5B and 6 which are assembled in an E-shape, and permanent magnets 2A and 2B attached to the inner surfaces of the upper and lower horizontal yokes 5A and 5B, respectively. Gaps 3A and 3B are formed between the center horizontal yoke 6 and the permanent magnets 2A and 2B, respectively, and a moving coil 20 which drives the head carriage (not shown) surrounds the center yoke 6 and is moved horizontally along the gaps 3A and 3B.

In the vicinity of the moving coil, leakage magnetic fluxes 10 from the exposed sides 4A and 4B of the permanent magnets 2A and 2B cannot be neglected but they affect the magnetic heads at the end of the actuator. FIG. 2 shows a distribution of the leakage magnetic fluxes of the magnetic circuit assembly. As shown by arrows $G_1$ and $G_2$ on the right hand, the leakage magnetic fluxes are dominant in the vicinities of contact areas 200A and 200B of the permanent magnets 2A and 2B and the upper and lower horizontal yokes 5A and 5B, respectively. A reason therefor may be that the leakage magnetic fluxes increase close to magnetic flux saturation densities of the yokes 5A and 5B in the vicinities of the contact areas 200A and 200B. The magnitude of the leakage magnetic fluxes increases as a thickness $l_2$ of the permanent magnets 2A and 2B is increased relative to a length $l_1$ of the gaps 3A and 3B. For a swing (rotary) type actuator, the leakage magnetic flux in the vicinity of the magnetic head amounts to approximately one gauss. The leakage magnetic fluxes act as a DC biasing magnetic field to an AC magnetic field when the information is read or written by the magnetic head and distort the AC magnetic field which inherently is symmetric. As a result, they degrade the recording and reproducing characteristics.

In order to reduce the influence of the leakage magnetic fluxes, the prior art magnetic disc device has a magnetic shield member arranged in the vicinity of the magnetic head to suppress the influence of the leakage magnetic fluxes from the voice coil motor as well as the magnetic influence from the external of the device. However, such a prior art construction is complex and cannot achieve a sufficient effect.

SUMMARY OF THE INVENTION

It is an object of the present invention to provide a rotary actuator for a magnetic disc device which can effectively shield leakage magnetic fluxes which are generated by a voice coil motor and adversely affect magnetic heads.

In order to achieve the above object, in accordance with the present invention, there is provided a rotary actuator for a magnetic disc device which comprises a head carriage rotatable in a horizontal plane for supporting at least one head arm having a magnetic head mounted at an end thereof; a moving coil mounted at the other end of the head carriage to protrude therefrom; a magnetic circuit assembly including a gap of a constant magnetic field serving as a space for the horizontal movement of the moving coil; a relative position of the moving coil and the magnetic circuit assembly being controlled by a current flowing through the moving coil to position the magnetic head on a record medium, characterized by that the magnetic circuit assembly comprises at least one piece of permanent magnet and a yoke member for circulating magnetic fluxes generated by the permanent magnet through the gap and that the sides of the permanent magnet and the yoke member which face the head carriage are covered with magnetic shield plates.

The above and other objects and the advantages of the present invention will be readily ascertained by referring to the following description of the invention and the accompanying drawings.

DESCRIPTION OF THE PREFERRED EMBODIMENTS

Figure 3:
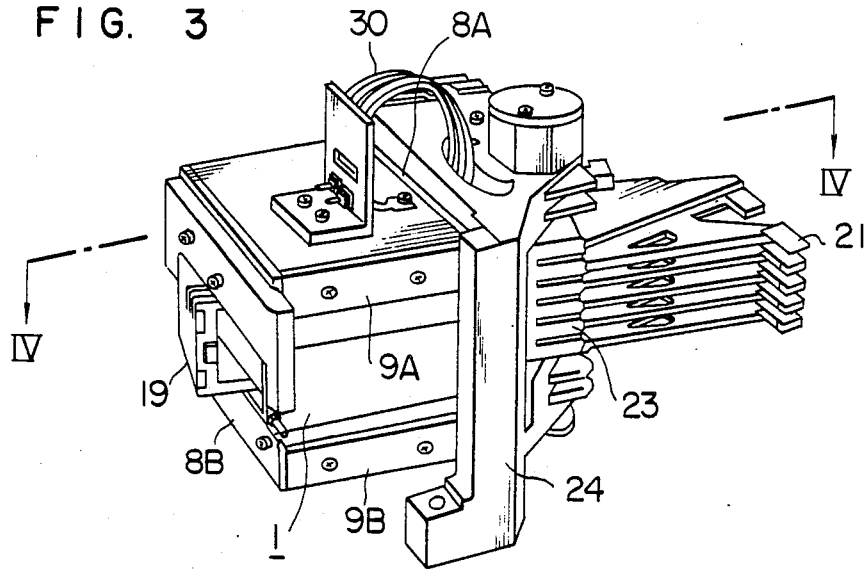
FIG. 3 is a perspective view of one embodiment of a rotary actuator in accordance with the present invention.
Figure 4:
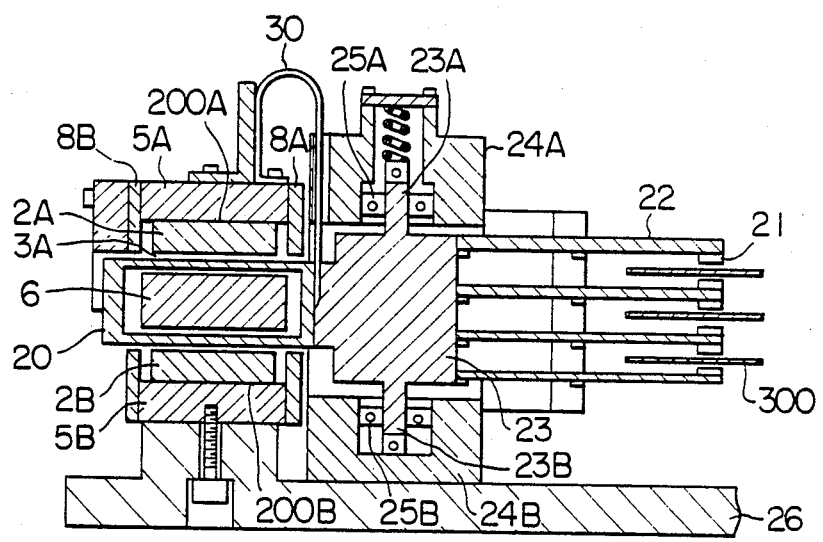
FIG. 4 is a sectional view taken along a line IV—IV of FIG. 3.

FIG. 3 shows a perspective external view of one embodiment of a rotary actuator in accordance with the present invention. FIG. 4 is a sectional view taken along a line IV—IV of FIG. 3.

Numeral 300 denotes a magnetic disc as an information recording medium, numeral 21 denotes a magnetic head, numeral 22 denotes a head arm, and numeral 23 denotes a head carriage which supports the head arms 22 on its front side and has a moving coil 20 on a rearwardly extending area. The head carriage 23 has upwardly and downwardly extending rotation shafts 23A and 23B and is horizontally rotatably supported by a base 26 by support blocks 24A and 24B having bearings 25A and 25B, respectively. Numeral 1 denotes an E-shaped magnetic circuit assembly which comprises horizontal yokes 5A, 5B and 6, a vertical yoke 7 (not shown) and permanent magnets 2A and 2B. It forms a voice coil motor for driving the head carriage 23, together with the moving coil 20. Numerals 8A, 8B, 9A and 9B denote magnetic shield plates mounted on the sides of the upper and lower horizontal yokes 5A and 5B to cover the sides of the permanent magnets 2A and 2B. Numeral 30 denotes a feeder for supplying an external drive current to the coil 20. By the supply of the current, an attraction force is created between the moving coil 20 and the magnetic circuit 1 so that a rotation angle of the carriage 23 is changed to position the magnetic head 21 onto a desired track of the disc.

Figure 1:
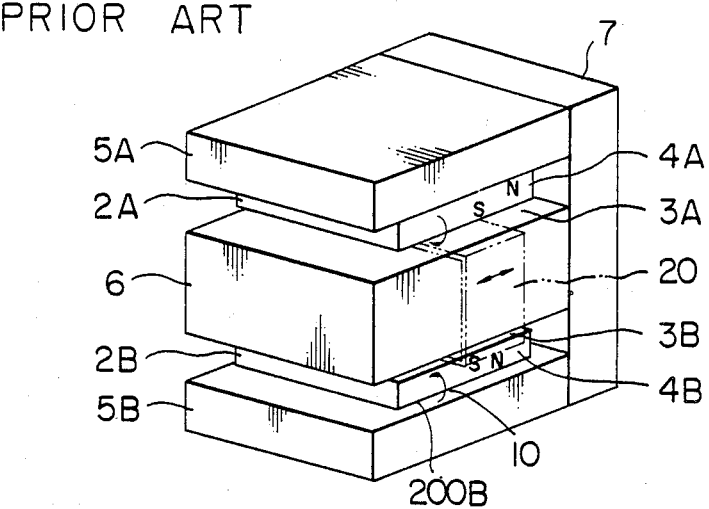
FIG. 1 is a perspective view of a prior art magnetic circuit assembly of a voice coil motor.
Figure 2:
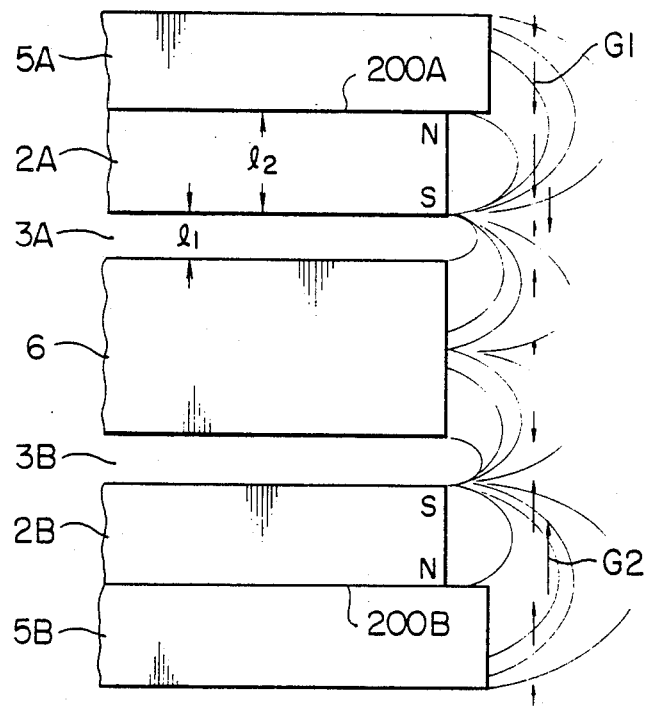
FIG. 2 shows a distribution of leakage magnetic fluxes which cause a problem in the assembly of FIG. 1.
Figure 5:
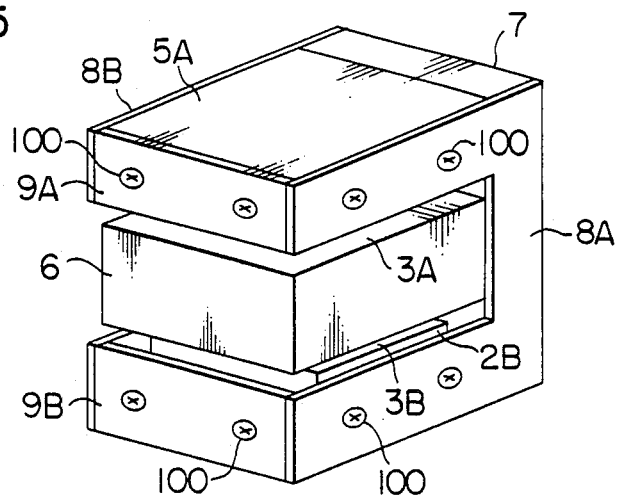
FIGS. 5, 6 and 7 are perspective views of magnetic circuit assemblies in accordance with the present invention.

FIG. 5 shows the magnetic shield plates mounted on the magnetic circuit assembly 1. In the present embodiment, as is apparent from the comparison to the prior art device shown in FIG. 1, the center horizontal yoke 6 and the gaps 3A and 3B are exposed, the front and rear sides of the yokes 5A, 5B and 7 are covered by the U-shaped magnetic shield plates 8A and 8B and the end surfaces of the upper and lower horizontal yokes 5A and 5B are covered by the rectangular magnetic shield plates 9A and 9B. Of those magnetic shield plates, the magnetic shield plate 8A which faces the head carriage 23 is particularly important. In the present embodiment, the sides of the permanent magnets 2A and 2B and the horizontal yokes 5A and 5B are covered by the magnetic shield plate 8A with the gaps 3A and 3B necessary for the movement of the moving coil 20 being left. Accordingly, the leakage magnetic fluxes toward the magnetic heads illustrated in FIG. 2 are effectively confined in the magnetic circuit assembly and the influence to the magnetic heads is reduced.

Figure 6:
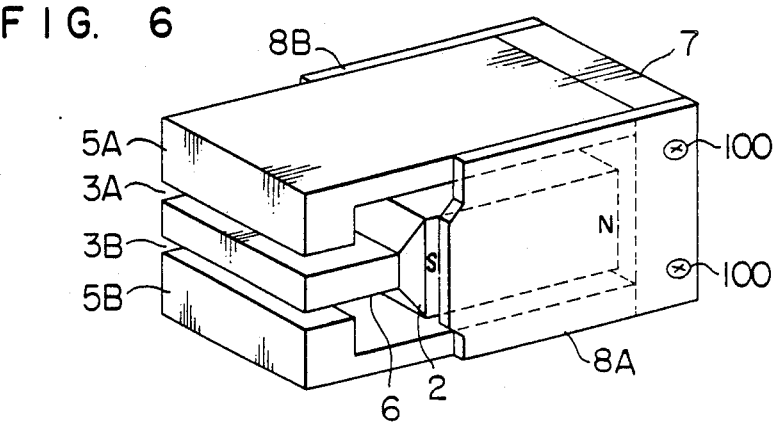

FIG. 6 shows another embodiment of the present invention. In the present embodiment, the magnetic circuit assembly has a U-shaped yoke constructed by the vertical yoke 7 and two horizontal yokes 5A and 5B, and has the permanent magnet 2 having the center yoke 6 at an end thereof arranged between the yokes 5A and 5B. The moving coil surrounds the center yoke 6 and is moved along the gaps 3A and 3B. The shield plates 8A and 8B cover the sides of portions of the horizontal yokes 5A and 5B and the sides of the vertical yoke to cover the sides of the permanent magnet 2 while leaving a space for the movement of the coil. They are fixed by screws 100. The leakage magnetic fluxes are created from the N pole of the permanent magnet 2 and the vertical yoke toward the S pole. Since the leakage of the magnetic fluxes to the external is prevented by the magnetic shield plates 8A and 8B, the influence to the magnetic heads is very small.

Figure 7:
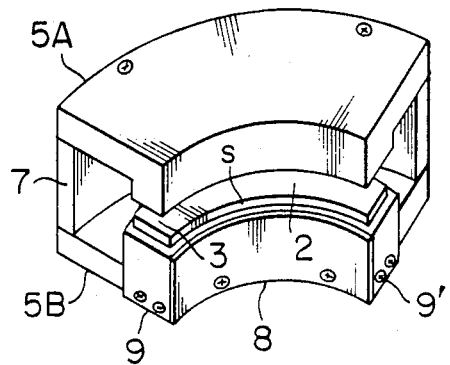

FIG. 7 shows a further embodiment of the present invention. Sector-shaped horizontal yokes 5A and 5B are mounted on and under an arcuate vertical yoke 7. A permanent magnet 2 is mounted at an end of a lower horizontal yoke 5B to form a gap 3 between it and an end of an upper horizontal yoke 5A. The sides of the permanent magnet 2 and the end of the lower yoke 5A are covered by magnetic shield plates 8, 9 and 9'. In the present magnetic circuit assembly, the moving coil is of thin plate type and the magnetic shield plate 8 is arranged to face the head carriage 23. The permanent magnet may be arranged either at the end of the upper yoke 5B or on both the upper and lower yokes.

As will be understood from the constructions shown in the illustrated embodiments, the rotary actuator of the present invention has the magnetic shield plates which cover the sides of the permanent magnets and the yokes from which large amount of leakage magnetic fluxes are generated toward the head carriage. Accordingly, the influence on the magnetic heads by the leakage magnetic fluxes is effectively prevented independently from the position of the coil.

We claim:

1. A rotary actuator for a magnetic disc device comprising:
   a head carriage rotatable in a horizontal plane and having a shaft for supporting at least one head arm extending radially outwardly from said shaft and having a magnetic head mounted at one end thereof;
   a moving coil mounted on said head carriage and extending radially outwardly from said shaft in a direction substantially opposite to the extension direction of said at least one head arm;
   a magnetic circuit assembly including a gap of a constant magnetic field serving as a space for the horizontal movement of said coil;
   a relative position of said coil and said magnetic circuit assembly being controlled by a current flowing through said coil so that said magnetic head is positioned on a record medium;
   said magnetic circuit assembly including at least one piece of a permanent magnet and a yoke member for circulating magnetic fluxes created by said permanent magnet through said gap; and
   at least one magnetic shield plate interposed between said permanent magnet and said shaft for covering one side of said permanent magnet and one portion of said yoke member which is fixedly mounted to the magnetic circuit assembly, said one side of said permanent magnet and said one portion of said yoke member facing said head carriage and being adjacent said shaft, and at least one other magnetic shield plate for covering at least one other side of said permanent magnet and at least one other portion of said yoke member, said at least one other side of said permanent magnet and said at least one other portion of said yoke member not facing said head carriage.

2. A rotary actuator according to claim 1 wherein said magnetic circuit assembly includes an E-shaped yoke member having a vertical yoke and upper, center and lower horizontal yokes, and two permanent magnets mounted on inner surfaces of the upper horizontal yoke and the lower horizontal yoke, respectively, to form gaps with the center horizontal yoke, said magnetic shield plates being mounted on portions of said upper and lower horizontal yokes to cover the sides of said permanent magnets, and said coil surrounds said center horizontal yoke and is moved horizontally.

3. A rotary actuator according to claim 2 wherein said magnetic shield plates are of U-shape and unitarily cover said upper horizontal yoke, said vertical yoke and said lower horizontal yoke.

4. A rotary actuator according to claim 1 wherein said magnetic circuit assembly includes a yoke member having a vertical yoke and upper and lower horizontal yokes, a permanent magnet extending horizontally from the vertical yoke between the upper and lower horizontal yokes, and a center yoke member mounted at an end of said permanent magnet to form gaps with said upper and lower horizontal yokes, said magnetic shield plates being arranged to cover the sides of said permanent magnet and the portions said vertical yoke and said upper and lower horizontal yokes facing said head carriage while leaving said center yoke member and the portions of said upper and lower horizontal yokes facing thereto uncovered, and said coil surrounds said center yoke member and is moved horizontally.

5. A rotary actuator according to claim 1 wherein said magnetic circuit assembly includes a U-shaped yoke member having an arcuate vertical yoke and two sector-shape horizontal yokes, and a permanent magnet mounted at one end of at least one of said horizontal yokes to face an end of the other horizontal yoke, said at least one magnetic shield plate being arranged to cover one side of said permanent magnet and one portion of the one end of the at least one horizontal yoke facing said head carriage, and said coil is horizontally moved along a gap between the permanent magnet and the other horizontal yoke.

* * * * *